US012180438B2

(12) United States Patent
Backer et al.

(10) Patent No.: US 12,180,438 B2
(45) Date of Patent: Dec. 31, 2024

(54) DISPERSANT POLYMER FOR AUTOMATIC DISHWASHING

(71) Applicants: Rohm and Haas Company, Collegeville, PA (US); Union Carbide Corporation, Seadrift, TX (US)

(72) Inventors: Scott Backer, Phoenixville, PA (US); Marianne Creamer, Warrington, PA (US); Paul Mercando, Pennsburg, PA (US); Eric Wasserman, Collegeville, PA (US); Ashutosh Umarvadia, Horsham, PA (US); Muhunthan Sathiosatham, Chalfont, PA (US); James Pawlow, Aurora, OH (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 440 days.

(21) Appl. No.: 17/601,763

(22) PCT Filed: May 19, 2020

(86) PCT No.: PCT/US2020/033512

§ 371 (c)(1),
(2) Date: Oct. 6, 2021

(87) PCT Pub. No.: WO2020/242813

PCT Pub. Date: Dec. 3, 2020

(65) Prior Publication Data

US 2022/0195344 A1 Jun. 23, 2022

Related U.S. Application Data

(60) Provisional application No. 62/854,480, filed on May 30, 2019.

(51) Int. Cl.

| | |
|---|---|
| ***C11D 1/66*** | (2006.01) |
| ***C11D 1/72*** | (2006.01) |
| ***C11D 3/08*** | (2006.01) |
| ***C11D 3/10*** | (2006.01) |
| ***C11D 3/20*** | (2006.01) |
| ***C11D 3/30*** | (2006.01) |
| ***C11D 3/36*** | (2006.01) |
| ***C11D 3/37*** | (2006.01) |
| ***C11D 3/386*** | (2006.01) |
| ***C11D 3/39*** | (2006.01) |

(52) U.S. Cl.

CPC .............. *C11D 3/3757* (2013.01); *C11D 1/72* (2013.01); *C11D 3/08* (2013.01); *C11D 3/10* (2013.01); *C11D 3/2082* (2013.01); *C11D 3/2086* (2013.01); *C11D 3/30* (2013.01); *C11D 3/361* (2013.01); *C11D 3/3765* (2013.01); *C11D 3/378* (2013.01); *C11D 3/38609* (2013.01); *C11D 3/3905* (2013.01); *C11D 3/3907* (2013.01); *C11D 3/3917* (2013.01); *C11D 2111/18* (2024.01)

(58) Field of Classification Search

CPC ........... C11D 3/08; C11D 3/10; C11D 3/3905; C11D 3/3907; C11D 3/3917; C11D 3/361; C11D 3/3757; C11D 3/3765; C11D 3/38609; C11D 3/38618

USPC ....... 510/223, 229, 372, 475, 476, 477, 488, 510/421, 392, 393

See application file for complete search history.

(56) References Cited

U.S. PATENT DOCUMENTS

| | | | |
|---|---|---|---|
| 4,676,911 A | 6/1987 | Fong | |
| 5,191,048 A | 3/1993 | Swift et al. | |
| 5,431,846 A | 7/1995 | Christopher et al. | |
| 6,641,754 B2 | 11/2003 | Buentello et al. | |
| 7,087,189 B2 | 8/2006 | Austin et al. | |
| 7,252,770 B2 | 8/2007 | Austin et al. | |
| 2006/0276371 A1 | 12/2006 | Schreiner et al. | |
| 2007/0125685 A1 | 6/2007 | Goliaszewski et al. | |
| 2017/0145352 A1* | 5/2017 | Türk | C11D 3/2086 |
| 2018/0362890 A1* | 12/2018 | Martin | C11D 3/33 |
| 2019/0256802 A1* | 8/2019 | Delplancke | C11D 3/38609 |

FOREIGN PATENT DOCUMENTS

| | | | | |
|---|---|---|---|---|
| AU | 2014315495 A1 * | 4/2016 | C11D 3/3769 |
| CA | 2218532 A1 * | 11/1996 | C11D 3/30 |
| EP | 1379475 B1 | 7/2009 | |
| EP | 2886634 A1 * | 6/2015 | C11D 1/66 |
| JP | 59000391 B2 | 1/1984 | |
| JP | 02005479 B2 | 2/1990 | |
| WO | WO-9415978 A1 * | 7/1994 | B01F 17/0028 |
| WO | 2019045938 | 3/2019 | |
| WO | 2019083718 | 5/2019 | |

OTHER PUBLICATIONS

Search Report from corresponding Chinese Application No. 202080032313.9 dated Jul. 16, 2023.

* cited by examiner

*Primary Examiner* — Gregory R Delcotto
(74) *Attorney, Agent, or Firm* — Thomas S. Deibert

(57) ABSTRACT

An automatic dishwashing composition is provided including a builder; a phosphonate; a nonionic surfactant; and a dispersant polymer, comprising: (a) 50 to 95 wt %, based on weight of the dispersant polymer, of structural units of a monoethylenically unsaturated monocarboxylic acid monomer; and (b) 5 to 50 wt %, based on weight of the dispersant polymer, of structural units of a sulfate bearing ethylenically unsaturated monomer.

15 Claims, No Drawings

DISPERSANT POLYMER FOR AUTOMATIC DISHWASHING

The present invention relates to a dispersant polymer for use in automatic dish washing formulations. In particular, the present invention relates to automatic dishwashing compositions incorporating a dispersant polymer which imparts desirable optical clarity performance to glassware.

Automatic dishwashing compositions are generally recognized as a class of detergent compositions distinct from those used for fabric washing or water treatment. Automatic dishwashing compositions are expected by users to produce a spotless and film-free appearance on washed articles after a complete cleaning cycle.

Phosphate-free automatic dishwashing compositions are increasingly desirable. Phosphate-free automatic dishwashing compositions typically rely on non-phosphate builders, such as salts of citrate, carbonate, silicate, disilicate, bicarbonate, aminocarboxylates and others to sequester calcium and magnesium from hard water, and upon drying, leave an insoluble visible deposit.

A family of polycarboxylate copolymers and their use as builders in detergent compositions and rinse aid compositions is disclosed by Christopher et al. in U.S. Pat. No. 5,431,846 for use in the final rinse step of a dish or warewashing machine. Christopher et al. disclose block copolymers comprising from 20 to 95 mole % of monomer units derived from itaconic acid or a homologue thereof and from 5 to 80 mole % of monomer units derived from vinyl alcohol or a lower vinyl ester are excellent binders of divalent or polyvalent metals and are useful as potentially biodegradable builders in detergent compositions as well as in machine dishwashing compositions and anti-scaling rinse compositions.

A family of terpolymers and their use, among other things, as dispersants is disclosed by Swift et al in U.S. Pat. No. 5,191,048. Swift et al teach a terpolymer comprising as polymerized units from about 15 to 55 mole percent of at least one first monomer selected from the group consisting of vinyl acetate, vinyl ethers and vinyl carbonates, from about 10 to 70 mole percent of at least one second monomer of an ethylenically unsaturated monocarboxylic acid, and from about 15 to 55 mole percent of at least one third monomer of an anhydride of a dicarboxylic acid and wherein said terpolymer is formed in a non-aqueous system such that less than about one more percent of the monomers are hydrolyzed during said polymerization.

Notwithstanding there remains a need for new dispersant polymers for use in automatic dish washing formulations. In particular, there remains a need for new dispersant polymers for use in automatic dish washing formulations, wherein the dispersant polymers provide desirable optical clarity performance on glassware.

The present invention provides an automatic dishwashing composition, comprising: a builder; a phosphonate; a nonionic surfactant; and a dispersant polymer, comprising: (a) 50 to 95 wt %, based on weight of the dispersant polymer, of structural units of a monoethylenically unsaturated monocarboxylic acid monomer; and (b) 5 to 50 wt %, based on weight of the dispersant polymer, of structural units of a sulfate bearing ethylenically unsaturated monomer.

The present invention provides an automatic dishwashing composition, comprising: a builder; a phosphonate; a nonionic surfactant; and a dispersant polymer, wherein the dispersant polymer comprises: (a) 70 to 83 wt %, based on weight of the dispersant polymer, of structural units of a monoethylenically unsaturated monocarboxylic acid monomer, wherein the structural units of the monoethylenically unsaturated monocarboxylic acid monomer are structural units of formula I

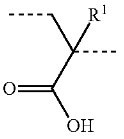

(I)

wherein each $R^1$ is independently selected from a hydrogen and a $—CH_3$ group; and (b) 17 to 30 wt %, based on weight of the dispersant polymer, of structural units of a sulfate bearing ethylenically unsaturated monomer, wherein the structural units of the sulfate bearing ethylenically unsaturated monomer are structural units of formula II

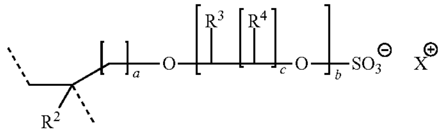

(II)

wherein a is an average of 1 to 2; wherein b is an average of 2 to 20; wherein c is an average of 1 to 3; wherein each $R^2$ is independently selected from a hydrogen and a $—CH_3$ group; wherein each $R^3$ and $R^4$ is independently selected from a hydrogen and a $C_{1-2}$, alkyl group; wherein X is a cation sufficient to balance the charge of formula II; and wherein the dispersant polymer has a weight average molecular weight of 1,000 to 50,000 Daltons.

The present invention provides a method of cleaning an article in an automatic dishwashing machine, comprising: providing at least one article; providing an automatic dishwashing composition according to the present invention; and, applying the automatic dishwashing composition to the at least one article.

DETAILED DESCRIPTION

Its been surprisingly found that the automatic dishwashing composition of the present invention exhibits a desirable optical clarity performance on glassware treated therewith in an automatic dishwashing machine.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "ethylenically unsaturated" as used herein and in the appended claims describes molecules having a carbon-carbon double bond, which renders it polymerizable. The term "multi-ethylenically unsaturated" as used herein and in the appended claims describes molecules having at least two carbon-carbon double bonds.

As used herein the term "(meth)acrylic" refers to either acrylic or methacrylic.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "structural units" as used herein and in the appended claims refers to the remnant of the indicated monomer; thus a structural unit of (meth)acrylic acid is illustrated:

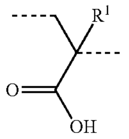

wherein the dotted lines represent the points of attachment to the polymer backbone and where $R^1$ is a hydrogen for structural units of acrylic acid and a $—CH_3$ for structural units of methacrylic acid.

Preferably, the automatic dishwashing composition of the present invention, comprises: a builder (preferably, 1 to 97 wt % (more preferably ≥1 wt %; still more preferably, ≥10 wt %; yet still more preferably, ≥25 wt %; most preferably, ≥50 wt %; preferably, ≤95 wt %; more preferably, ≤90 wt %; still more preferably, ≤85 wt %; most preferably, ≤80 wt %), based on the dry weight of the automatic dishwashing composition, of the builder, wherein the builder is selected from the group consisting of carbonate, bicarbonate, citrate, silicate and mixtures thereof); a phosphonate (preferably, 0.5 to 10 wt % (more preferably, 0.75 to 7.5 wt %; still more preferably, 2 to 7 wt %; most preferably, 4 to 6 wt %), based on the dry weight of the automatic dishwashing composition, of the phosphonate) (preferably, wherein the phosphonate has a weight average molecular weight of ≤1,000 Daltons); a nonionic surfactant (preferably, 0.2 to 15 wt % (more preferably, 0.5 to 10 wt %; most preferably, 1.5 to 7.5 wt %), based on the dry weight of the automatic dishwashing composition, of the nonionic surfactant); and a dispersant polymer (preferably, 0.5 to 15 wt % (more preferably, 0.5 to 10 wt %; still more preferably, 1 to 8 wt %; most preferably, 2 to 4 wt %), based on the dry weight of the automatic dishwashing composition, of the dispersant polymer); wherein the dispersant polymer comprises: (a) 50 to 95 wt % (preferably, 60 to 90 wt %; more preferably, 65 to 86 wt %; still more preferably, 70 to 83 wt %; most preferably, 75 to 81 wt %), based on weight of the dispersant polymer, of structural units of a monoethylenically unsaturated monocarboxylic acid monomer; and (b) 5 to 50 wt % (preferably, 10 to 40 wt %; more preferably, 14 to 35 wt %; still more preferably, 17 to 30 wt %; most preferably, 19 to 25 wt %), based on weight of the dispersant polymer, of structural units of a sulfate bearing ethylenically unsaturated monomer.

Preferably, the automatic dishwashing composition of the present invention, comprises: a builder. Preferably, the builder used in the automatic dishwashing composition of the present invention, comprises at least one of a carbonate, a citrate and a silicate. More preferably, the builder used in the automatic dishwashing composition of the present invention, comprises at least one of sodium carbonate, sodium bicarbonate and sodium citrate. Most preferably, the builder used in the automatic dishwashing composition of the present invention, comprises at least one of sodium carbonate and sodium citrate.

Preferably, the automatic dishwashing composition of the present invention, comprises: 1 to 97 wt % of a builder. Preferably, the automatic dishwashing composition of the present invention, comprises: ≥1 wt % (preferably, ≥10 wt %; more preferably, ≥25 wt %; most preferably, ≥50 wt %), based on the dry weight of the automatic dishwashing composition, of a builder. Preferably, the automatic dishwashing composition of the present invention, comprises: ≤95 wt % (preferably, ≤90 wt %; more preferably, ≤85 wt %; most preferably, ≤80 wt %), based on the dry weight of the automatic dishwashing composition, of a builder. Weight percentages of carbonates, citrates and silicates are based on the actual weights of the salts, including metal ions.

The term "carbonate(s)" as used herein and in the appended claims refers to alkali metal or ammonium salts of carbonate, bicarbonate, percarbonate, and/or sesquicarbonate. Preferably, the carbonate used in the automatic dishwashing composition (if any) is selected from the group consisting of carbonate salts of sodium, potassium and lithium (more preferably, salts of sodium or potassium; most preferably, salts of sodium). Percarbonate used in the automatic dishwashing composition (if any) is selected from salts of sodium, potassium, lithium and ammonium (more preferably, salts of sodium or potassium; most preferably, salts of sodium). Most preferably, the carbonate used in the automatic dishwashing composition (if any) includes at least one of sodium carbonate, sodium bicarbonate and sodium percarbonate. Preferably, when the builder used in the automatic dishwashing composition of the present invention includes carbonate, the automatic dishwashing composition preferably, comprises 0 to 97 wt % (preferably, 5 to 75 wt %; more preferably, 10 to 60 wt %; most preferably 20 to 50 wt %) of carbonate.

The term "citrate(s)" as used herein and in the appended claims refers to alkali metal citrates. Preferably, the citrate used in the automatic dishwashing composition (if any) is selected from the group consisting of citrate salts of sodium, potassium and lithium (more preferably, salts of sodium or potassium; most preferably, salts of sodium). More preferably, the citrate used in the automatic dishwashing composition (if any) is sodium citrate. Preferably, when the builder used in the automatic dishwashing composition of the present invention includes citrate, the automatic dishwashing composition preferably, comprises 0 to 97 wt % (preferably, 5 to 75 wt %; more preferably, 10 to 60 wt %; most preferably 20 to 40 wt %) of the citrate.

The term "silicate(s)" as used herein and in the appended claims refers to alkali metal silicates. Preferably, the silicate used in the automatic dishwashing composition (if any) is selected from the group consisting of silicate salts of sodium, potassium and lithium (more preferably, salts of sodium or potassium; most preferably, salts of sodium). More preferably, the silicate used in the automatic dishwashing composition (if any) is sodium disilicate. Preferably, the builder used in the automatic dishwashing composition of the present invention includes a silicate. Preferably, when the builder used in the automatic dishwashing composition of the present invention includes a silicate, the automatic dishwashing composition preferably, comprises 0 to 97 wt %

(preferably, 0.1 to 10 wt %; more preferably, 0.5 to 7.5 wt %; most preferably 0.75 to 3 wt %) of the silicate(s).

Preferably, the automatic dishwashing composition of the present invention comprises 0.5 to 10 wt % (more preferably, 0.75 to 7.5 wt %; still more preferably, 2 to 7 wt %; most preferably, 4 to 6 wt %), based on the dry weight of the automatic dishwashing composition, of a phosphonate. More preferably, the automatic dishwashing composition of the present invention comprises 0.5 to 10 wt % (more preferably, 0.75 to 7.5 wt %; still more preferably, 2 to 7 wt %; most preferably, 4 to 6 wt %), based on the dry weight of the automatic dishwashing composition, of a phosphonate; wherein the phosphonate is a low molecular weight having a weight average molecular weight of ≤1,000 Daltons. Still more preferably, the automatic dishwashing composition of the present invention comprises 0.5 to 10 wt % (more preferably, 0.75 to 7.5 wt %; still more preferably, 2 to 7 wt %; most preferably, 4 to 6 wt %), based on the dry weight of the automatic dishwashing composition, of a phosphonate; wherein the phosphonate comprises at least one of 1-hydroxyethylidene-1,1-diphosphonic acid (HEDP) and a salt of 1-hydroxyethylidene-1,1-diphosphonic acid. Most preferably, the automatic dishwashing composition of the present invention comprises 0.5 to 10 wt % (more preferably, 0.75 to 7.5 wt %; still more preferably, 2 to 7 wt %; most preferably, 4 to 6 wt %), based on the dry weight of the automatic dishwashing composition, of a phosphonate; wherein the phosphonate is selected from the group consisting of 1-hydroxyethylidene-1,1-diphosphonic acid (HEDP) and salts thereof.

Preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of a nonionic surfactant. More preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant, wherein the surfactant comprises a fatty alcohol alkoxylate. Most preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant, wherein the surfactant is a fatty alcohol alkoxylate.

Preferably, the nonionic surfactant used in the automatic dishwashing composition of the present invention has a formula selected from $RO\text{-}(M)_x\text{-}(N)_y\text{—}OH$, and $RO\text{-}(M)_x\text{-}(N)_y\text{—}(P)_z\text{—}OH$ wherein M represents structural units of ethylene oxide, N represents structural units of $C_{3\text{-}18}$ 1,2-epoxyalkane, P represents structural units of $C_{6\text{-}18}$ alkyl glycidyl ether, x is 5 to 40, y is 0 to 20, z is 0 to 3 and R represents a $C_{6\text{-}22}$ linear or branched alkyl group.

Preferably, the nonionic surfactant used in the automatic dishwashing composition of the present invention has a formula selected from $RO\text{-}(M)_x(N)_y\text{—}OH$, and $RO\text{-}(M)_x\text{-}(N)_y\text{—}O\text{—}R'$ wherein M and N are structural units derived from alkylene oxides (of which one is ethylene oxide); x is 5 to 40; y is 0 to 20; R represents a $C_{6\text{-}22}$ linear or branched alkyl group; and R' represents a group derived from the reaction of an alcohol precursor with a $C_{6\text{-}22}$ linear or branched alkyl halide, epoxyalkane or glycidyl ether.

Preferably, the nonionic surfactant used in the automatic dishwashing composition of the present invention has a formula $RO\text{-}(M)_x\text{-}OH$ wherein M represents structural units of ethylene oxide and x is at least three (preferably, at least five; preferably, no more than ten; more preferably, no more than eight). Preferably, wherein R and R' each have at least eight (more preferably, at least ten) carbon atoms.

Preferably, the automatic dishwashing composition of the present invention, includes a dispersant polymer. More preferably, the automatic dishwashing composition of the present invention, includes: 0.5 to 15 wt %, based on the dry weight of the automatic dishwashing composition, of a dispersant polymer. Still more preferably, the automatic dishwashing composition of the present invention, includes 0.5 to 10 wt %, based on the dry weight of the automatic dishwashing composition, of a dispersant polymer. Yet more preferably, the automatic dishwashing composition of the present invention, includes 1 to 8 wt %, based on the dry weight of the automatic dishwashing composition, of a dispersant polymer. Most preferably, the automatic dishwashing composition of the present invention, includes 2 to 4 wt %, based on the dry weight of the automatic dishwashing composition, of a dispersant polymer.

Preferably, the dispersant polymer used in the automatic dishwashing composition of the present invention, comprises: 50 to 95 wt % (preferably, 60 to 90 wt %; more preferably, 65 to 86 wt %; still more preferably, 70 to 93 wt %; most preferably, 75 to 81 wt %), based on weight of the dispersant polymer, of structural unites of a monoethylenically unsaturated monocarboxylic acid monomer. More preferably, the dispersant polymer used in the automatic dishwashing composition of the present invention, comprises: 50 to 95 wt % (preferably, 60 to 90 wt %; more preferably, 65 to 86 wt %; still more preferably, 70 to 93 wt %; most preferably, 75 to 81 wt %), based on weight of the dispersant polymer, of structural unites of a monoethylenically unsaturated monocarboxylic acid monomer; wherein the structural units of the monoethylenically unsaturated monocarboxylic acid monomer are structural units of formula I (I)

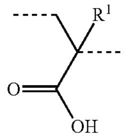

wherein each $R^1$ is independently selected from a hydrogen and a $\text{—}CH_3$ group (preferably, a hydrogen). Most preferably, the dispersant polymer used in the automatic dishwashing composition of the present invention, comprises: 50 to 95 wt % (preferably, 60 to 90 wt %; more preferably, 65 to 86 wt %; still more preferably, 70 to 93 wt %; most preferably, 75 to 81 wt %), based on weight of the dispersant polymer, of structural unites of a monoethylenically unsaturated monocarboxylic acid monomer; wherein the structural units of the monoethylenically unsaturated monocarboxylic acid monomer are structural units of formula I, wherein each $R^1$ is independently selected from a hydrogen and a —$CH_3$ group; wherein $R^1$ is a hydrogen in 50 to 100 mol % (preferably, 75 to 100 mol %; more preferably, 90 to 100 mol %; still more preferably, 98 to 100 mol %; most preferably, 100 mol %) of the structural units of formula I in the dispersant polymer.

Preferably, the dispersant polymer used in the automatic dishwashing composition of the present invention, comprises: 5 to 50 wt % (preferably, 10 to 40 wt %; more preferably, 14 to 35 wt %; still more preferably, 17 to 30 wt %; most preferably, 19 to 25 wt %), based on weight of the dispersant polymer, of structural units of a sulfate bearing ethylenically unsaturated monomer. More preferably, the dispersant polymer used in the automatic dishwashing composition of the present invention, comprises: 5 to 50 wt % (preferably, 10 to 40 wt %; more preferably, 14 to 35 wt %; still more preferably, 17 to 30 wt %; most preferably, 19 to 25 wt %), based on weight of the dispersant polymer, of structural units of a sulfate bearing ethylenically unsaturated monomer; wherein the structural units of the sulfate bearing ethylenically unsaturated monomer are of formula II (II)

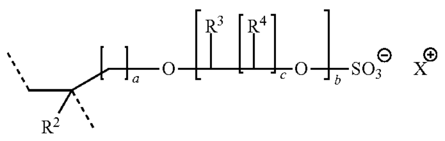

wherein a is an average of 1 to 2 (preferably, a is 1); wherein b is an average of 2 to 20 (preferably, 2 to 10; more preferably, 2 to 6; most preferably, 2 to 4); wherein c is an average of 1 to 3 (preferably, 1 to 2; more preferably, 1); wherein each $R^2$ is independently selected from a hydrogen and a —$CH_3$ group; wherein each $R^3$ and $R^4$ is independently selected from a hydrogen and a $C_{1-2}$ alkyl group) (preferably, a hydrogen or a methyl group; more preferably, a hydrogen); and wherein X is a cation sufficient to balance the charge of formula II (preferably, wherein X is a monovalent cation; more preferably, wherein X is a cation selected from the group consisting of a sodium ion, a potassium ion and an ammonium ion). Most preferably, the dispersant polymer used in the automatic dishwashing composition of the present invention, comprises: 5 to 50 wt % (preferably, 10 to 40 wt %; more preferably, 14 to 35 wt %; still more preferably, 17 to 30 wt %; most preferably, 19 to 25 wt %), based on weight of the dispersant polymer, of structural units of a sulfate bearing ethylenically unsaturated monomer; wherein the structural units of the sulfate bearing ethylenically unsaturated monomer are of formula II, wherein a is an average of 1; wherein b is an average of 2 to 6; wherein c is an average of 1; wherein each $R^2$ is independently selected from a hydrogen and a —$CH_3$ group; wherein $R^2$ is a hydrogen in 50 to 100 mol % (preferably, 75 to 100 mol %; more preferably, 90 to 100 mol %; still more preferably, 98 to 100 mol %; most preferably, 100 mol %) of the structural units of formula II; wherein each $R^2$ is independently selected from a hydrogen and a —$CH_3$ group; wherein $R^1$ is a hydrogen in 50 to 100 mol % (preferably, 75 to 100 mol %; more preferably, 90 to 100 mol %; still more preferably, 98 to 100 mol %; most preferably, 100 mol %) of the structural units of formula II in the dispersant polymer; and wherein each $R^3$ and $R^4$ is independently selected from a hydrogen and a $C_{1-2}$ alkyl group (preferably, a hydrogen or a methyl group; more preferably, a hydrogen); and wherein X is a cation sufficient to balance the charge of formula II (preferably, wherein X is a monovalent cation; more preferably, wherein X is a cation selected from the group consisting of a sodium ion, a potassium ion and an ammonium ion).

Preferably, the dispersant polymer used in the automatic dishwashing composition of the present invention has a weight average molecular weight of 1,000 to 50,000 Daltons. More preferably, the dispersant polymer used in the automatic dishwashing composition of the present invention has a weight average molecular weight of 10,000 to 40,000 Daltons. Still more preferably, the dispersant polymer used in the automatic dishwashing composition of the present invention has a weight average molecular weight of 15,000 to 30,000 Daltons. Most preferably, the dispersant polymer used in the automatic dishwashing composition of the present invention has a weight average molecular weight of 20,000 to 25,000 Daltons.

Preferably, the dispersant polymer used in the automatic dishwashing composition of the present invention comprises ≤8 wt % (preferably, ≤5 wt %; more preferably, ≤3 wt %; most preferably, ≤1 wt %), based on weight of the dispersant polymer, of structural units of esters of (meth)acrylic acid.

Preferably, the dispersant polymer used in the automatic dishwashing composition of the present invention comprises ≤0.3 wt % (more preferably, ≤0.1 wt %; still more preferably, ≤0.05 wt %; yet still more preferably, ≤0.03 wt %; most preferably, ≤0.01 wt %), based on weight of the dispersant polymer, of structural units of multi-ethylenically unsaturated crosslinking monomer.

Preferably, the dispersant polymer used in the automatic dishwashing composition of the present invention comprises <5 mol % (preferably, <1 mol %; more preferably, <0.1 mol %; still more preferably, <0.05 mol %; yet more preferably, <0.03 mol %; still yet more preferably, <0.01 mol %; most preferably, <the detectable limit) of structural units of ethylenically unsaturated dicarboxylic acid monomer (e.g., itaconic acid, maleic acid, maleic anhydride, citraconic acid, mesaconic acid, glutaconic acid, aconitic acid, fumaric acid, tricarboxy ethylene).

Preferably, the dispersant polymer used in the automatic dishwashing composition of the present invention can be produced using techniques well known in the art.

Preferably, the dispersant polymer used in the automatic dishwashing composition of the present invention is provided in the form of a water-soluble solution polymer, a slurry, a dried powder, granules or another solid form.

The automatic dishwashing composition of the present invention, optionally further comprises: an additive. Preferably, the automatic dishwashing composition of the present invention, further comprises: an additive selected from the group consisting of an alkaline source; a bleaching agent (e.g., sodium percarbonate, sodium perborate); a bleach activator (e.g., tetraacetylethylenediamine (TAED)); a bleach catalyst (e g, manganese(II) acetate, cobalt(II) chloride, bis(TACN)magnesium trioxide diacetate); an enzyme (e.g., protease, amylase, lipase, or cellulase); a foam suppressant; a coloring agent; a fragrance; a silicate; an additional builder; an antibacterial agent; a filler; a deposit control polymer and mixtures thereof. More preferably, the automatic dishwashing composition of the present invention, further comprises an additive, wherein the additive is selected from the group consisting of a bleaching agent, a bleach activator, an enzyme, a filler and mixtures thereof. Still more preferably, the automatic dishwashing composition of the present invention, further comprises an additive, wherein the additive includes a bleaching agent (e.g., sodium percarbonate, sodium perborate); a bleach activator (e.g., tetraacetylethylenediamine (TAED)) and an enzyme (e.g., protease, amylase, lipase, or cellulase). Most preferably, the automatic dishwashing composition of the present invention, further comprises an additive, wherein the additive includes a bleaching agent, wherein the bleaching agent includes sodium percarbonate; a bleach activator, wherein the bleach activator includes tetraacetylethylenediamine (TAED); and an enzyme, wherein the enzyme includes a protease and an amylase.

Fillers included in tablets or powders are inert, water-soluble substances, typically sodium or potassium salts (e.g., sodium sulfate, potassium sulfate, sodium chloride, potassium chloride). In tablets and powders, fillers are typically present in amounts ranging from 0 wt % to 75 wt %. Fillers included in gel formulations typically include those mentioned for use in tablets and powders and also water. Fragrances, dyes, foam suppressants, enzymes and antibacterial agents usually total no more than 10 wt %, alternatively no more than 5 wt %, of the automatic dishwashing composition.

The automatic dishwashing composition of the present invention, optionally further comprises: an alkaline source. Suitable alkaline sources include, without limitation, alkali metal carbonates and alkali metal hydroxides, such as sodium or potassium carbonate, bicarbonate, sesquicarbonate, sodium, lithium, or potassium hydroxide, or mixtures of the foregoing. Sodium hydroxide is preferred. The amount of alkaline source in the automatic dishwashing composition of the present invention (if any) is at least 1 wt % (preferably, at least 20 wt %) and up to 80 wt % (preferably, up to 60 wt %), based on the dry weight of the automatic dishwashing composition.

The automatic dishwashing composition of the present invention, optionally further comprises: a bleaching agent (e.g., sodium percarbonate). The amount of the bleaching agent in the automatic dishwashing composition of the present invention (if any) is preferably at a concentration of 1 to 25 wt % (more preferably, 5 to 20 wt %), based on the dry weight of the automatic dishwashing composition.

The automatic dishwashing composition of the present invention, optionally further comprises: a bleach activator (e.g., tetraacetylethylenediamine (TAED)). The amount of the bleach activator in the automatic dishwashing composition of the present invention (if any) is preferably at a concentration of 1 to 10 wt % (more preferably, 2.5 to 7.5 wt %), based on the dry weight of the automatic dishwashing composition.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of phosphate (measured as elemental phosphorus). Preferably, the automatic dishwashing composition of the present invention is phosphate free.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof. Most preferably, the automatic dishwashing composition of the present invention contains 0 wt % of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

Preferably, the automatic dishwashing composition of the present invention has a pH (at 1 wt % in water) of at least 9 (preferably, ≥10; more preferably, ≥11.5). Preferably, the automatic dishwashing composition of the present invention has a pH (at 1 wt % in water) of no greater than 13.

Preferably, the automatic dishwashing composition of the present invention can be formulated in any typical form, e.g., as a tablet, powder, block, monodose, sachet, paste, liquid or gel. The automatic dishwashing compositions of the present invention are useful for cleaning ware, such as eating and cooking utensils, dishes, in an automatic dishwashing machine.

Preferably, the automatic dishwashing composition of the present invention are suitable for use under typical operating conditions. For example, when used in an automatic dishwashing machine, typical water temperatures during the washing process preferably are from 20° C. to 85° C., preferably 30° C. to 70° C. Typical concentrations for the automatic dishwashing composition as a percentage of total liquid in the dishwasher preferably are from 0.1 to 1 wt %, preferably from 0.2 to 0.7 wt %. With selection of an appropriate product form and addition time, the automatic dishwashing compositions of the present invention may be present in the prewash, main wash, penultimate rinse, final rinse, or any combination of these cycles.

Preferably, the method of cleaning an article in an automatic dishwashing machine of the present invention, comprises: providing at least one article (preferably, wherein the at least one article includes glassware); providing an automatic dishwashing composition of the present invention; and applying the automatic dishwashing composition to the at least one article (preferably, in an automatic dishwasher).

Some embodiments of the present invention will now be described in detail in the following Examples.

The weight average molecular weight, Mw; number average molecular weight, MN; and polydispersity (PDI) values reported in the Examples were measured by gel permeation chromatography (GPC) on an Agilent 1100 series LC system equipped with an Agilent 1100 series refractive index. Samples were dissolved in HPCL grade THF/FA mixture (100:5 volume/volume ratio) at a concentration of approximately 9 mg/mL and filtered through at 0.45 μm syringe filter before injection through a 4.6×10 mm Shodex KF guard column, a 8.0×300 mm Shodex KF 803 column, a 8.0×300 mm Shodex KF 802 column and a 8.0×100 mm Shodex KF-D column. A flow rate of 1 mL/min and temperature of 40° C. were maintained. The columns were calibrated with narrow molecular weight PS standards (EasiCal PS-2, Polymer Laboratories, Inc.).

Example S1: Synthesis of Sulfate Monomer A

To a 4-neck, 500 mL round bottom flask equipped with an overhead stirrer, a condenser, a thermocouple, a heating mantle, and a nitrogen purge/bubbler, was added allyl(polypropylene glycol) (177.0 g; Polyglycol SF13402 with approx. 2.75 units propylene oxide per molecule); sulfamic acid (131.6 g), and urea catalyst (13.1 g). The flask contents were then stirred and heated to 110° C. under a stream of nitrogen. The flask contents were initially heterogeneous and colorless. As the temperature of the flask contents exceeded 80° C., the flask contents turned yellow, and then reddish-brown. The flask contents eventually started to exotherm, reaching a peak temperature of 125° C. At this point, heating mantle was turned off until the temperature of the flask contents stabilized/decreased to 110° C. A significant amount of an off-white precipitate started to drop from the mixture. The precipitate was eventually broken up with a spatula. The flask contents were heated and stirred for 6 hours. The solid precipitate tended to jam up the stirrer, and make mixing and temperature control problematic. The resulting flask contents was red-brown and highly viscous. The next morning, a total of 200 mL of water was added to the flask contents and stirred for 90 minutes until all solids broke up. The resulting solution was filtered through medium-fine filter paper to remove any undissolved solids, and stored in a jar. The resulting product monomer solution was a dark brown-red liquid of low viscosity (56.3 wt % solids). $^{13}C\ \{^1H\}$ NMR in DMSO-$d_6$ (δ), ppm: 135, 116, 71-75, 20, 17. This product monomer solution was neutralized with a 28 wt % ammonium hydroxide solution prior to use in polymerization. Final solids content was 55 wt %.

Example S2: Synthesis of Sulfate Monomer B

To a 3-neck, 500 mL round bottom flask equipped with an overhead stirrer, a condenser, a thermocouple, a heating mantle and a nitrogen purge/bubbler, was added allyloxy (diethylene oxide) (99.5 g, available from Gelest), sulfamic acid (67.5 g), and urea catalyst (8.2 g). The flask contents were then stirred and heated to 110° C. under a stream of nitrogen. The flask contents were initially heterogeneous and colorless. As the flask contents reached 80° C., heating was stopped and the solution turned light brown. The flask contents started to exotherm, reaching a peak temperature of 121° C. At which point, the temperature of the flask contents stabilized and decreased to 110° C. The temperature of the flask contents was then maintained at 110° C. for 5 h. The resulting monomer solution was light brown liquid. Water (130 mL) was added to the monomer solution with stirring for 30 minutes until the resulting mixture was homogeneous. The product monomer solution was a clear light golden mixture with low viscosity. This product monomer solution was neutralized with an ammonium hydroxide solution prior to use in polymerization. Final solids content: 57.2 wt %. $^{13}C\ \{^1H\}$ NMR in $D_2O/H_2O$ (δ), ppm: 133.87, 118.07, 71.34, 69.37, 68.41, 67.26.

Example S3: Dispersant Polymer—20 wt % Sulfate Monomer A and 80 wt % Acrylic Acid A round-bottom flask equipped with overhead mixer, reflux condenser, and ports for the introduction of liquid ingredients was charged with deionized water (126 g), a 1.5 wt % solution of iron(II) sulfate in deionized water (1.9 g) and 72.6 g of product neutralized Sulfate Monomer A solution (55 wt % solids) prepared according to Example S1. Then a solution of sodium metabisulfite (0.32 g) in deionized water (1.9 g) was added to the flask contents. The flask contents were then heated with stirring to a set point temperature of 72° C. An initiator solution was prepared by mixing sodium persulfate (1.66 g), a 50 wt % sodium hydroxide solution (6.65 g), and deionized water (54 g). A chain-transfer solution was then prepared by dissolving sodium metabisulfite (9.7 g) in deionized water (29.1 g). When the temperature of the flask contents reached the set point of 72° C., acrylic acid (160 g) was fed at a rate of 1.33 g/min over 120 min. The initiator solution was fed at 0.49 g/min over 125 min. The chain-transfer solution was fed at a rate of 0.35 g/min over 110 min. When the acrylic acid addition ended the transfer line was flushed with deionized water (3 g) into the reactor. A total of 8.5 g of deionized water was used to rinse the other feed lines into the reactor. The temperature of the flask contents was maintained at 72-74° C. during reaction by combination of heating mantle, cooling air directed at the flask, and the reaction exotherm. When the last addition was completed, a chase solution of sodium persulfate (0.43 g) dissolved in deionized water (15 g) was added in one aliquot, followed by a wash of deionized water (3.1 g). The temperature set point was reduced below 60° C., at which point the flask contents were neutralized by two additions of 50 wt % sodium hydroxide (70 g) each, between which an aliquot of a solution of 30 wt % hydrogen peroxide (1 g) was added (followed by a deionized water rinse (5 g)). The vessel containing the sodium hydroxide solution was flushed with deionized water (4 g) into the reactor. Deionized water (100 g) was then added to the flask contents. The flask contents were allowed to cool to near room temperature, and then the product dispersant polymer solution was poured from the flask into a bottle. The product dispersant polymer solution was 34.88 wt % solids, had a pH of 6.34, a viscosity of 545 cPs, a residual acrylic acid level of 243 ppm, and weight- and number-average molecular weight of 22,706 Daltons and 6,921 Daltons, respectively (GPC).

Example S4: Dispersant Polymer—10 wt % Sulfate Monomer A and 90 wt % Acrylic Acid A round-bottom flask equipped with overhead mixer, reflux condenser, and ports for the introduction of liquid ingredients was charged with deionized water (126 g), a 1.5 wt % solution of iron(II) sulfate in deionized water (1.9 g) and 36.6 g of product neutralized Sulfate Monomer A solution (55 wt % solids) prepared according to Example S1. Then a solution of sodium metabisulfite (0.32 g) in deionized water (1.9 g) was added to the flask contents. The flask contents were then heated with stirring to a set point temperature of 72° C. An initiator solution was prepared by mixing sodium persulfate (1.66 g), a 50 wt % sodium hydroxide solution (6.65 g), and deionized water (54 g). A chain-transfer solution was then prepared by dissolving sodium metabisulfite (9.7 g) in deionized water (29.1 g). When the temperature of the flask contents reached the set point of 72° C., acrylic acid (180 g) was fed over 120 min. The initiator solution was fed at 0.49 g/min over 125 min. The chain-transfer solution was fed at a rate of 0.35 g/min over 110 min. When the acrylic acid addition ended the transfer line was flushed with deionized water (3 g) into the reactor. A total of 8.5 g of deionized water was used to rinse the other feed lines into the reactor. The temperature of the flask contents was maintained at 72-74° C. during reaction by combination of heating mantle, cooling air directed at the flask, and the reaction exotherm. When the last addition was completed, a chase solution of sodium persulfate (0.43 g) dissolved in deionized water (15 g) was added in one aliquot, followed by a wash of deionized water (3.1 g). The temperature set point was reduced below 60° C., at which point the flask contents were neutralized by two additions of 50 wt % sodium hydroxide (70 g) each, between which an aliquot of a solution of 30 wt % hydrogen peroxide (1 g) was added (followed by a deionized water rinse (5 g)). The vessel containing the sodium hydroxide solution was flushed with deionized water (4 g) into the reactor. Deionized water (50 g) was then added to the flask contents. The flask contents were allowed to cool to near room temperature, and then the product dispersant polymer solution was poured from the flask into a bottle. The product dispersant polymer solution was 38.96 wt % solids, had a pH of 6.15, a viscosity of 775 cPs, a residual acrylic acid level below 35 ppm, and weight- and number-average molecular weight of 17,118 Daltons and 5,690 Daltons, respectively (GPC).

Example S5: Dispersant Polymer—15 wt % Sulfate Monomer B and 85 wt % Acrylic Acid A round-bottom flask equipped with overhead mixer, reflux condenser, and ports for the introduction of liquid ingredients was charged with deionized water (126 g), a 1.5 wt % solution of iron(II) sulfate in deionized water (1.9 g) and 52.47 g of product neutralized Sulfate Monomer B solution (57.2 wt % solids) prepared according to Example S2. Then a solution of sodium metabisulfite (0.38 g) in deionized water (1.9 g) was added to the flask contents. The flask contents were then heated with stirring to a set point temperature of 72° C. An initiator solution was prepared by mixing sodium persulfate (1.66 g), a 50 wt % sodium hydroxide solution (6.65 g), and deionized water (54 g). A chain-transfer solution was then prepared by dissolving sodium metabisulfite (9.7 g) in deionized water (40 g). When the temperature of the flask contents reached the set point of 72° C., acrylic acid (170 g) was fed over 90 min. The initiator solution was fed over 95 min. The chain-transfer solution was fed over 80 min. When the acrylic acid addition ended the transfer line was flushed with deionized water (3 g) into the reactor. A total of 8.5 g of deionized water was used to rinse the other feed lines into the reactor. The temperature of the flask contents was maintained at 72-74° C. during reaction by combination of heating mantle, cooling air directed at the flask, and the reaction exotherm. When the last addition was completed, a chase solution of sodium persulfate (0.43 g) dissolved in deionized water (15 g) was added in one aliquot, followed by a wash of deionized water (3.1 g). The temperature set point was reduced below 60° C., at which point the flask contents were neutralized by two roughly equal additions of 50 wt % sodium hydroxide (135 g total), between which an aliquot of a solution of 30 wt % hydrogen peroxide (1 g) was added (followed by a deionized water rinse (5 g)). The vessel containing the sodium hydroxide solution was flushed with deionized water (4 g) into the reactor. Deionized water (25 g) was then added to the flask contents. The flask contents were allowed to cool to near room temperature, and then the product dispersant polymer solution was poured from the flask into a bottle. The product dispersant polymer solution was 38.49 wt % solids, had a pH of 6.09, a viscosity of 510 cPs, a residual acrylic acid level below 25 ppm, and weight- and number-average molecular weight of 12,791 Daltons and 4,451 Daltons, respectively (GPC).

Example SC1: Dispersant Polymer—10 wt % AMPS and 90 wt % Acrylic Acid

A round-bottom flask equipped with overhead mixer, reflux condenser, and ports for the introduction of liquid ingredients was charged with deionized water (191 g), a 1.5 wt % solution of iron(II) sulfate in deionized water (2.87 g). The mixture was heated with stirring to a set point of 72° C. An initiator solution was prepared by mixing sodium persulfate (2 g), a 50 wt % sodium hydroxide solution (8.0 g), and deionized water (81 g). A chain-transfer solution was then prepared by dissolving sodium metabisulfite (11.62 g) in deionized water (44 g). A monomer solution was prepared acrylic acid (270 g) and a 50 wt % solution of 2-acrylamido-2-propanesulfonic acid sodium salt (AMPS)(60 g). When the temperature of the flask contents reached the set point of 72° C., the monomer solution was fed to the flask at a rate of 4 g/min over 90 min. The initiator solution was fed at a rate of 1.0 g/min over 95 min. The chain-transfer solution was fed at a rate of 0.725 g/min over 80 min. When the monomer feed ended the transfer line was flushed with deionized water (4.5 g) into the reactor. A total of 12 g of deionized water was used to rinse the other feed lines into the reactor. The temperature of the flask contents was maintained at 72-74° C. during reaction by combination of heating mantle, cooling air directed at the flask, and the reaction exotherm. When the last addition was completed, a chase solution of sodium persulfate (0.65 g) dissolved in deionized water (22 g) was added in one aliquot, followed by a wash of deionized water (5 g). The temperature set point was reduced below 60° C., at which point the flask contents were neutralized by two roughly equal additions of 50 wt % sodium hydroxide (212 g total), between which an aliquot of a solution of 30 wt % hydrogen peroxide (1.5 g) was added (followed by a deionized water rinse (7 g)). The vessel containing the sodium hydroxide solution was flushed with deionized water (4 g) into the reactor. Deionized water (75 g) was then added to the flask contents. The flask contents were allowed to cool to near room temperature, and then the product dispersant polymer solution was poured from the flask into a bottle. The product dispersant polymer solution was 40.26 wt % solids, had a pH of 6.05, a viscosity of 855 cPs, a residual acrylic acid level below 19 ppm, and weight- and number-average molecular weights of 12,547 Daltons and 4,533 Daltons, respectively (GPC).

Automatic Dishwashing Tests

The dispersant polymers prepared according to Comparative Example SC1 and Examples S3-S5 above were tested for performance during automatic dishwashing. The dishwashing formulation used is shown in Table 1.

TABLE 1

| Ingredient | Weight Percent (as active) |
|---|---|
| sodium citrate | 30 |
| sodium carbonate | 25 |
| sodium percarbonate | 15 |
| TAED | 4 |
| Dispersant Polymer | 3 |

TABLE 1-continued

| Ingredient | Weight Percent (as active) |
|---|---|
| surfactant[a] | 5 |
| protease[b] | 2 |
| amylase[c] | 1 |
| HEDP[d] | 5 |
| sodium sulfate | 10 |

[a]DOWFAX ™ 20B102 non-ionic surfactant available from The Dow Chemical Company.
[b]Savinase 12T, Novozymes.
[c]Stainzyme 12T, Novozymes.
[d]Dequest 2010 available from Italmatch Chemicals.

The food soil used in the automatic dishwashing tests is shown in Table 2.

TABLE 2

| Ingredients | Quantities for 3 L Batch |
|---|---|
| water | 2 L |
| margarine | 300 g |
| potato starch | 45 g |
| Quark powder | 75 g |
| benzoic acid | 3 g |
| milk | 150 g |
| egg yolks | 9 |
| ketchup | 75 g |
| mustard | 75 g |

Procedure for Preparing Food Soil

Heat water to 70° C. and add the potato starch, quark powder, benzoic acid and margarine. Agitate until the margarine is well dissolved. Then add the milk and agitate well. Let the mix cool down. When the temperature is lower than 45° C., add the egg yolks, ketchup and mustard. Mix well.

Dishwashing Test Conditions

Machine: Miele ADW, Model L1222. Program: 1 with R-Zeit 3: 65° C., 30 minute wash cycle. Water: 375 ppm hardness (as $CaCO_3$, confirmed by EDTA titration), Ca:Mg=3:1. Food soil: 50 g (introduced at t=0, frozen in cup).

Comparative Examples C1-C3 and Examples 1-3: Testing in Automatic Dishwashing Glasses (Schott tumblers) were used for the testing. After 30 successive washes using fresh detergent dose (20 g) and food soil dose (50 g) for each wash cycle, the glasses were removed from the dishwasher. After drying in open air following the $30^{th}$ wash, filming ratings were determined by trained evaluators by observations of glass tumblers in a light box with controlled illumination from below. Glass tumblers were rated for filming according to ASTM method ranging from 1 (no film) to 5 (heavily filmed). An average value of 1 to 5 for filming was determined. The detergent mixtures used in the 6-machine parallel test is shown in Table 3 along with the filming results.

TABLE 3

| Ex. | Dispersant Polymer DescriptionWeight | Weight avg. MW | Filming |
|---|---|---|---|
| C1 | Comp. Ex. SC1 | 12,547 Daltons | 1 |
| C2 | Commercial dispersant[a] | 4,500 Daltons | 5 |
| C3 | Commercial dispersant[b] | 20,000 Daltons | 1 |
| 1 | Example S3 | 22,706 Daltons | 1 |
| 2 | Example S4 | 17,118 Daltons | 2 |
| 3 | Example S5 | 12,791 Daltons | 2 |

[a]Acusol ™ 445N dispersant polyacrylic acid polymer available from The Dow Chemical Company.
[b]Acusol ™ 588 dispersant polyacrylic acid/AMPS copolymer available from The Dow Chemical Company.

We claim:

1. An automatic dishwashing composition, comprising:
a builder;
a phosphonate;
a nonionic surfactant; and
a dispersant polymer, comprising:
(a) 50 to 95 wt %, based on weight of the dispersant polymer, of structural units of a monoethylenically unsaturated monocarboxylic acid monomer; and
(b) 5 to 50 wt %, based on weight of the dispersant polymer, of structural units of a sulfate bearing ethylenically unsaturated monomer; wherein the structural units of the sulfate bearing ethylenically unsaturated monomer are structural units of formula II (II)

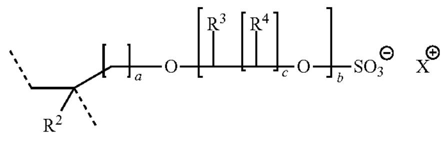

wherein a is an average of 1 to 2; wherein b is an average of 2 to 20; wherein c is an average of 1 to 3; wherein each $R^2$ is independently selected from a hydrogen and a $—CH_3$ group; wherein each $R^3$ and $R^4$ is independently selected from a hydrogen and a $C_{1-2}$ alkyl group; wherein X is a cation sufficient to balance the charge of formula II.

2. The automatic dishwashing composition of claim 1, wherein the automatic dishwashing composition contains less than 0.1 wt %, based on the dry weight of the automatic dishwashing composition, of phosphate, measured as elemental phosphorus.

3. The automatic dishwashing composition of claim 2, wherein the automatic dishwashing composition contains less than 0.1 wt %, based on the dry weight of the automatic dishwashing composition, of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

4. The automatic dishwashing composition of claim 3, wherein the dispersant polymer comprises:
(a) 70 to 83 wt %, based on weight of the dispersant polymer, of structural units of the monoethylenically unsaturated monocarboxylic acid monomer, wherein the structural units of the monoethylenically unsaturated monocarboxylic acid monomer are structural units of formula I

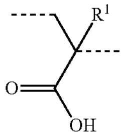

(I)

wherein each $R^1$ is independently selected from a hydrogen and a $-CH_3$ group; and (b) 17 to 30 wt %, based on weight of the dispersant polymer, of structural units of the sulfate bearing ethylenically unsaturated monomer; wherein a is an average of 1; wherein b is an average of 2 to 10; wherein c is an average of 1 to 2; wherein each $R^3$ and $R^4$ is independently selected from a hydrogen and a methyl group; and wherein the dispersant polymer has a weight average molecular weight of 1,000 to 50,000 Daltons.

5. The automatic dishwashing composition of claim 4, wherein $R^1$ is a hydrogen in 50 to 100 mol % of the structural units of formula I in the dispersant polymer.

6. The automatic dishwashing composition of claim 5, wherein a is an average of 1; wherein b is an average of 2 to 6; wherein c is an average of 1; and wherein $R^2$ is a hydrogen in 50 to 100 mol % of the structural units of formula II in the dispersant polymer.

7. The automatic dishwashing composition of claim 6, wherein the dispersant polymer comprises:

(a) 75 to 81 wt % of structural units of formula I; and (b) 19 to 25 wt % of structural units of formula II; and wherein the dispersant polymer has a weight average molecular weight of 15,000 to 30,000 Daltons.

8. The automatic dishwashing composition of claim 7, further comprising an additive selected from the group consisting of a bleaching agent, a bleach activator, an enzyme, a filler, and mixtures thereof.

9. A method of cleaning an article in an automatic dishwashing machine, comprising:

providing at least one article;

providing an automatic dishwashing composition according to claim 1; and, applying the automatic dishwashing composition to the at least one article.

10. The method of claim 9, wherein the automatic dishwashing composition provided and applied to the at least one article is according to claim 8.

11. The automatic dishwashing composition of claim 1, wherein the dispersant polymer comprises <0.1 mol % of structural units of ethylenically unsaturated dicarboxylic acid monomer.

12. The automatic dishwashing composition of claim 1, wherein the dispersant polymer comprises <0.05 mol % of structural units of ethylenically unsaturated dicarboxylic acid monomer.

13. The automatic dishwashing composition of claim 1, wherein the dispersant polymer comprises <0.03 mol % of structural units of ethylenically unsaturated dicarboxylic acid monomer.

14. The automatic dishwashing composition of claim 1, wherein the dispersant polymer comprises <0.01 mol % of structural units of ethylenically unsaturated dicarboxylic acid monomer.

15. The automatic dishwashing composition of claim 1, wherein the dispersant polymer comprises <the detectable limit of structural units of ethylenically unsaturated dicarboxylic acid monomer.

* * * * *